United States Patent
Diaz Diaz et al.

(10) Patent No.: US 10,348,143 B2
(45) Date of Patent: Jul. 9, 2019

(54) MULTI-POLE COMPONENT FOR AN ELECTRIC MACHINE

(71) Applicant: SIEMENS AKTIENGESELLSCHAFT, München (DE)

(72) Inventors: Ignacio Diaz Diaz, München (DE); Matthias Dorfner, Kirchdorf am Inn (DE); Zeljko Jajtic, München (DE)

(73) Assignee: Siemens Aktiengesellschaft, München (DE)

( * ) Notice: Subject to any disclaimer, the term of this patent is extended or adjusted under 35 U.S.C. 154(b) by 508 days.

(21) Appl. No.: 14/796,056

(22) Filed: Jul. 10, 2015

(65) Prior Publication Data

US 2016/0164355 A1  Jun. 9, 2016

(30) Foreign Application Priority Data

Jul. 1, 2014 (EP) .................................. 14175245

(51) Int. Cl.
| | |
|---|---|
| *H02K 1/27* | (2006.01) |
| *H02K 3/12* | (2006.01) |
| *H02K 41/02* | (2006.01) |
| *H02K 7/18* | (2006.01) |

(52) U.S. Cl.
CPC ............. *H02K 1/2746* (2013.01); *H02K 3/12* (2013.01); *H02K 7/1838* (2013.01); *H02K 41/02* (2013.01)

(58) Field of Classification Search
CPC ...... H02K 1/2746; H02K 3/12; H02K 7/1838; H02K 1/148
USPC ............ 310/154.35, 154.38, 154.45, 156.33, 310/156.48, 156.49, 156.51, 156.52, 310/156.54, 156.55, 156.59, 156.61, 310/156.63, 156.65
See application file for complete search history.

(56) References Cited

U.S. PATENT DOCUMENTS

| | | | | |
|---|---|---|---|---|
| 6,452,301 B1 * | 9/2002 | Van Dine | ............. | H02K 1/2773 310/156.12 |
| 8,310,122 B2 * | 11/2012 | Pabst | ................... | H02K 1/2773 29/596 |
| 8,994,483 B2 * | 3/2015 | Dupraz | ................. | H02K 33/00 335/229 |
| 9,178,391 B2 * | 11/2015 | Claramunt Estecha | | ..................... H02K 1/2766 |
| 9,257,890 B2 * | 2/2016 | Erd | ........................ | H02K 1/278 |
| 9,431,858 B2 * | 8/2016 | Muniz Casais | ........ | H02K 1/278 |

(Continued)

FOREIGN PATENT DOCUMENTS

| | | |
|---|---|---|
| DE | 102006013590 A1 | 9/2007 |
| EP | 2413477 A2 | 2/2012 |
| EP | 2479873 A2 | 7/2012 |

*Primary Examiner* — Bernard Rojas
*Assistant Examiner* — Ahmed Elnakib
(74) *Attorney, Agent, or Firm* — Henry M. Feiereisen LLC

(57) ABSTRACT

A multi-pole component for an electric machine includes an upper side, a lower side, a first magnetic pole having a surface on the upper side, a second magnetic pole having a surface in a tangential direction adjacent to the first magnetic pole on the upper side and a soft-magnetic device. The soft-magnetic device has a recess between the first magnetic pole and the second magnetic pole. A vertical direction is directed from the upper side to the lower side at right angle to a tangential direction. The first magnetic pole has a permanent magnet with a magnetization in one direction, and the second magnetic pole does not have a permanent magnet.

13 Claims, 5 Drawing Sheets

(56) References Cited

U.S. PATENT DOCUMENTS

| | | | | |
|---|---|---|---|---|
| 9,660,489 B2* | 5/2017 | Muniz Casais | ...... | H02K 1/2773 |
| 9,712,004 B2* | 7/2017 | Muniz Casais | ...... | H02K 1/2773 |
| 9,742,229 B2* | 8/2017 | Muniz Casais | ...... | H02K 1/2766 |
| 9,973,045 B2* | 5/2018 | Muniz Casais | ........ | H02K 1/278 |
| 2004/0150281 A1* | 8/2004 | Malmberg | ............ | H01F 7/0221 |
| | | | | 310/156.28 |
| 2006/0220483 A1* | 10/2006 | Jones | ..................... | H02K 1/278 |
| | | | | 310/156.19 |
| 2008/0088193 A1* | 4/2008 | Tervaskanto | ........... | H02K 1/276 |
| | | | | 310/156.22 |
| 2008/0218021 A1* | 9/2008 | Lange | .................. | H02K 21/125 |
| | | | | 310/156.02 |
| 2009/0134626 A1* | 5/2009 | Hoppe | .................... | H02K 21/24 |
| | | | | 290/55 |
| 2010/0301695 A1 | 12/2010 | Yamada et al. | | |
| 2010/0327670 A1* | 12/2010 | Chung | ................. | H02K 41/031 |
| | | | | 310/12.15 |
| 2011/0043065 A1* | 2/2011 | Piercey | .................. | H02K 1/278 |
| | | | | 310/156.12 |
| 2012/0025534 A1* | 2/2012 | Miyamoto | ........... | H02K 1/2746 |
| | | | | 290/55 |
| 2012/0139385 A1* | 6/2012 | Sawada | .................. | H02K 1/148 |
| | | | | 310/216.074 |
| 2012/0187696 A1* | 7/2012 | Miyamoto | ........... | H02K 1/2746 |
| | | | | 290/55 |
| 2012/0187793 A1* | 7/2012 | Hartmann | ............... | H02K 1/278 |
| | | | | 310/156.28 |
| 2015/0288232 A1* | 10/2015 | Lemma | ................ | H02K 7/1838 |
| | | | | 290/55 |
| 2016/0164355 A1* | 6/2016 | Diaz Diaz | ............ | H02K 1/2746 |
| | | | | 310/156.54 |

\* cited by examiner

MULTI-POLE COMPONENT FOR AN ELECTRIC MACHINE

CROSS-REFERENCES TO RELATED APPLICATIONS

This application claims the priority of European Patent Application, Ser. No. 14175245.1, filed Jul. 1, 2014, pursuant to 35 U.S.C. 119(a)-(d), the disclosure of which is incorporated herein by reference in its entirety as if fully set forth herein.

BACKGROUND OF THE INVENTION

The present invention relates to a multi-part component for an electric machine. The present invention further relates to a secondary part for the electric machine with the multi-pole component and to a method for manufacturing the multi-pole component, to a method for manufacturing the electric machine and to a method for servicing the electric machine.

It would be desirable and advantageous to make a technical contribution to an electric machine in order to make the electric machine available at low cost and with high quality.

SUMMARY OF THE INVENTION

According to one aspect of the present invention, a multi-pole component for an electric machine includes an upper side, a lower side, a first magnetic pole having a surface on the upper side, the first magnetic pole including a permanent magnet with a magnetization in one direction, a second magnetic pole having a surface in a tangential direction adjacent to the first magnetic pole on the upper side and being devoid of a permanent magnet, and a soft-magnetic device having a recess between the first magnetic pole and the second magnetic pole, wherein a vertical direction is aligned from the upper side to the lower side at a right angle to the tangential direction.

According to another aspect of the present invention, a secondary part for an electric machine includes a multi-pole component which includes an upper side, a lower side, a first magnetic pole having a surface on the upper side, the first magnetic pole including a permanent magnet with a magnetization in one direction, a second magnetic pole having a surface in a tangential direction adjacent to the first magnetic pole on the upper side and being devoid of a permanent magnet, and a soft-magnetic device having a recess between the first magnetic pole and the second magnetic pole, wherein a vertical direction is aligned from the upper side to the lower side at a right angle to the tangential direction, and a secondary part segment which comprises the multi-pole component.

According to still another aspect of the present invention, an electric machine includes a multi-pole component which includes an upper side, a lower side, a first magnetic pole having a surface on the upper side, the first magnetic pole including a permanent magnet with a magnetization in one direction, a second magnetic pole having a surface in a tangential direction adjacent to the first magnetic pole on the upper side and being devoid of a permanent magnet, and a soft-magnetic device having a recess between the first magnetic pole and the second magnetic pole, wherein a vertical direction is aligned from the upper side to the lower side at a right angle to the tangential direction, a primary part, a secondary part including the multi-pole component for a relative rotational movement and/or linear movement between the primary part and the secondary part during operation of the electric machine, and a winding for operating the electric machine, the winding interacting magnetically with the multi-pole component via an air gap between the primary part and the secondary part According to still another aspect of the present invention, a method for manufacturing a multi-pole component which includes an upper side, a lower side, a first magnetic pole having a surface on the upper side, the first magnetic pole including a permanent magnet with a magnetization in one direction, a second magnetic pole having a surface in a tangential direction adjacent to the first magnetic pole on the upper side and being devoid of a permanent magnet, and a soft-magnetic device having a recess between the first magnetic pole and the second magnetic pole, wherein a vertical direction is aligned from the upper side to the lower side at a right angle to the tangential direction, includes providing the first magnetic pole with a permanent magnet, with the second magnetic pole being devoid of a permanent magnet.

According to still another aspect of the present invention, a method for manufacturing an electric machine as set forth above includes disposing the multi-pole component, which comprises the first magnetic pole with permanent magnet, and the second magnetic pole devoid of a permanent magnet, on the secondary part.

According to still another aspect of the present invention, a method for servicing an electric machine as set forth above includes replacing the multi-pole component, which comprises the first magnetic pole with permanent magnet and the second magnetic pole without permanent magnet.

The present invention resolves prior art shortcomings by providing the multi-pole component having the soft-magnetic device with the recess between the first magnetic pole and the second magnetic pole, the first magnetic pole having the permanent magnet with the magnetization and the second magnetic pole having no permanent magnet. Advantageously at low cost a multi-pole component can in this way have a small proportion of cost-intensive parts despite high demands on the quality of an electric machine with a multi-pole component. Cost-intensive components are permanent magnets for example.

In accordance with the present invention, a multi-pole component, secondary part and electric machine also extends in an axial direction which runs at right angle to the tangential directions and the vertical directions.

A magnetic pole, especially the first magnetic pole or the second magnetic pole, is a place around which the magnetic field strength is especially high. This is advantageously achieved for the first magnetic pole by the first magnetic pole having a permanent magnet. The second magnetic pole advantageously comprises a soft-magnetic material for this purpose which is magnetically better-conducting than the surroundings of the second magnetic pole.

For this purpose the second magnetic pole can advantageously have, at low cost and with high quality, ferromagnetic metals such as iron, cobalt, nickel or ferromagnetic alloys, such as iron silicon alloys or iron cobalt alloys for example, in order to concentrate the magnetic field in the second magnetic pole. The ferromagnetic metals or alloys can advantageously be manufactured at low cost and with high quality by for example molding and/or punching in the required dimensions. The relative permeability number of ferromagnetic materials is very much greater than 1. Advantageously iron or specific ferromagnetic iron alloys, such as iron silicon alloys for example, have a relative permeability number of greater than 300. This advantageously enables, at low cost and with high quality, iron or specific ferromagnetic iron alloys, such as iron silicon alloys for example to concentrate the magnetic field in the second magnetic pole.

Advantageously, the second magnetic pole also does not necessarily have to have a winding which creates a magnetic field which is essentially constant over time. Thus, in an advantageous achievement of the object, a permanent magnet can be dispensed with for the second magnetic pole.

The soft-magnetic device can guide a magnetic flux between the first and the second magnetic pole. Thus, in an advantageous achievement of the object, the second magnetic pole can consist of a soft-magnetic material.

A secondary part according to the invention for an electric machine with an inventive multi-pole component has the further advantage that advantageously, at low cost and with high quality, electric machines can be provided with different dimensions or configurations with one or more inventive multi-pole components for relative rotational movements and/or linear movements. Advantageously the secondary part can comprise a further secondary part segment which has a further inventive multi-pole component, wherein the secondary part has a surface which features the surface of the multi-pole component and the surface of the further multi-pole component. Thus a magnetic interaction between the primary and the secondary part across a larger area or a number of areas can be achieved advantageously at low cost and with high quality.

An electric machine according to the invention has the further advantage that, advantageously at low cost and with high quality, approximately 50% of permanent magnet material can be saved and when this is done a loss of feed force can be limited to between 20 and 25%. The approximately 50% saving in permanent magnet material and the limitation of the feed force loss to between 20 and 30% relate in this case to a quantity of permanent magnet material and a feed force in an electric machine in which each magnetic pole of the secondary part has a permanent magnet. Furthermore the primary part can be the same for the comparison. The feed force in this case is the force or torque which is exerted on the primary or secondary part by a magnetic interaction between primary part and secondary part via the air gap.

In operation of an electric machine according to the invention, the primary part can move relative to the secondary part or the secondary part can move relative to the primary part, or primary and secondary part can be held in a specific position in order to provide force. In such cases the secondary part can interact via the air gap with the primary part in that the primary part has at least one winding in which, during operation of an inventive electric machine, an electric current can flow.

During operation, the electric machine can also be supplied with mechanical energy through a movement of the primary part relative to the secondary part and electric energy can be obtained at the winding for an electric load.

The method for manufacturing the multi-pole component according to the invention has the further advantage that advantageously, at low cost and with high quality, fewer permanent magnets have to be provided. In this way warehouse space, especially for risk-prone parts such as permanent magnets, can be saved.

The method for manufacturing the electrical machine according to the invention has the further advantage that the forces of attraction between the primary and secondary part are reduced by some 70%—in relation to an electric machine in which each magnetic pole of the secondary part has a permanent magnet. In these comparisons between an inventive electric machine and such an electric machine in which all magnetic poles have a permanent magnet it is naturally assumed that these have the same number of magnetic poles on the secondary part. Advantageously, at low cost and with high quality, the ease of installation of the multi-pole components on the secondary part is simplified by virtue of the lower forces of attraction. Furthermore the secondary part and any carrier of the secondary part that might be present can have a simpler design, since these have to accept lower forces.

During servicing of an electrical machine work is carried out at intervals in relation to its manufacture.

The method for servicing the electrical machine according to the invention has the further advantage that an inventive multi-pole component is advantageously accessible at low cost and with high quality on an inventive electric machine or on an inventive secondary part, i.e. in a simple manner, for replacement of the multi-pole component of the secondary part.

According to another advantageous feature of the present invention, the one direction of the magnetization of the permanent magnet can run predominantly on a line in parallel relation to the vertical direction. Thus the multi-pole component can advantageously, at low cost and with high quality, have a smaller thickness, measured from the upper to the lower side.

The multi-pole component or the secondary part can have an arrangement of magnetic poles, wherein all magnetizations of the permanent magnets are directed in a vertical direction to the upper side or to the lower side. Thus, advantageously at low cost and with high quality, the directions of the magnetizations of the permanent magnets can be safeguarded in a simple manner, since with an inventive manufacturing an inventive multi-pole component, equipping the multi-pole component with permanent magnets the magnetization of all of which is oriented away from the upper side or is oriented away from the lower side can be carried out. This can advantageously also be insured for an inventive multi-pole component, secondary part and electric machine and also for an inventive method for a service by a simple check. Advantageously a check can be restricted to a permanent magnet of the multi-pole component or secondary part.

According to another advantageous feature of the present invention, the second magnetic pole can protrude in relation to the first magnetic pole from the upper side. This advantageously, at low cost and with high quality, enables an electric machine to be made available in that an overhang which is produced by the projection of the second magnetic pole advantageously protects the permanent magnet, particularly against mechanical influences, for example against contamination in the air gap and the overhang additionally, advantageously at low cost and with high quality, increases the feed force for an inventive electric machine.

According to another advantageous feature of the present invention, the recess can run in the direction of the magnetization. This advantageously enables, at low cost and with high quality, the first magnetic pole to be separated from the second magnetic pole by a reducing a pole stray flux between the first and the second magnetic pole. For this purpose the recess is empty or has a material which has a low relative permeability number or which is already so heavily saturated by the magnetic field of the permanent magnet that the material for a separation of the first from the second magnetic pole during operation of the electric machine is negligible.

An extension of the second magnetic pole in tangential directions can be smaller than the extension of the first magnetic pole in tangential directions. Thus, at low cost and with high quality, the first magnetic pole is able to be separated from the second magnetic pole in that advantageously the pole stray flux between the first and the second magnetic pole is reduced by enlarging the distance in tangential directions between the first and the second magnetic pole.

The soft-magnetic device, along with the recess, can form a form-fit facility for safeguarding the permanent magnet against slipping. Thus, at low cost and with high quality, the permanent magnet can be safeguarded during operation of an electric machine against centrifugal forces and/or during the installation of the permanent magnet, said magnet can be advantageously secured before it is finally fastened.

Edges which delimit the surface of the second magnetic pole can be rounded. Thus for example, at low cost and with high quality, a latching torque/a latching force can be reduced or the quality of the torque or force can be improved.

According to another advantageous feature of the present invention, the multi-pole component can have a fastening element for fastening a multi-pole component, wherein the fastening element is located in a vertical direction below the surface of the second magnetic pole. Thus the multi-pole component can advantageously, at low cost and with high quality, be fastened to the secondary part with the fastening element below the surface of the second magnetic pole. During fastening or on replacement of an inventive multi-pole component there is less of an obstruction present through a magnetic field, since the second magnetic pole does not have any permanent magnets. Also the second magnetic pole can be used in a space-saving manner for a fastening facility with the fastening element.

According to another advantageous feature of the present invention, the surface of the second magnetic pole can have a recess for actuating a fastening facility for the multi-pole component. Thus advantageously, at low cost and with high quality, an electric machine can be made available in which the fastening facility can advantageously be actuated from the upper side of the multi-pole component.

The fastening facility can have an actuation facility for actuating the fastening facility from the upper side or from the lower side of the multi-pole component. Thus advantageously, at low cost and with high quality, an inventive multi-pole component can be advantageously fastened or replaced during the manufacturing of the electric machine, during servicing, if necessary also by the customer, by actuating the fastening facility from the upper side or from the lower side, depending on the situation at the installation location or set up location of the electric machine. With an inventive method for servicing an inventive electric machine the multi-pole component fastened to the secondary part can be made accessible. This is then advantageously possible, at low cost and with high quality, if the multi-pole component has been advantageously fastened for the situation at the set up location by actuating the fastening facility from the upper side or from the lower side. The multi-pole component can then advantageously, at low cost and with high quality, be released from the same side by actuating the fastening facility. If the multi-pole component was attached from an unfavorable side then at least the new multi-pole component to be fastened can be fastened advantageously for the circumstances at the set up location by actuating the fastening facility from the upper side or from the lower side.

The actuation facility can have a hole with an inner thread for actuation from the upper or lower side by tightening or loosening a fastening element with an outer thread. This advantageously enables, at low cost and with high quality, an electric machine with an actuation facility able to be actuated from the upper and the lower side of the multi-pole component to be made available. The fastening element can be a screw for example.

The recess on the surface of the second magnetic pole can have a part of an edge which is able to be expanded to one edge by a further multi-pole component. This advantageously enables, at low cost and with high quality, a first and a second multi-pole component to be fastened to their magnetic pole without permanent magnets or to one of their magnetic poles without permanent magnets together on a secondary part. The first and the second multi-pole components are advantageously inventive multi-pole components in such cases.

According to another advantageous feature of the present invention, a multi-pole component can have a further magnetic pole without permanent magnets which possesses a surface on the upper side, wherein in tangential directions the first magnetic pole is located between the further and the second magnetic pole. Thus advantageously, at low cost and with high quality, an electric machine can be made available for which advantageously to both sides of the permanent magnet, areas without permanent magnets can be made available in a space-saving way with little additional space requirement along with the arrangement of magnetic poles.

According to another advantageous feature of the present invention, a multi-pole component can have a further fastening element for fastening the multi-pole component, wherein the further fastening element is located in a vertical direction below the surface of the further magnetic pole. Thus advantageously, at low cost and with high quality, an inventive electric machine can be provided in which the multi-pole component, with the aid of the fastening element and the further fastening elements, can be fastened on both sides of the permanent magnet. This enables the forces or torques which for example are caused by the magnetic effect of the permanent magnet, to be distributed evenly to the fastening points on both sides of the permanent magnet.

According to another advantageous feature of the present invention, the multi-pole component can have an arrangement of magnetic poles, with the arrangement including the first magnetic pole, the second magnetic pole, at least one further first magnetic pole having a surface on the upper side and including a permanent magnet, and at least one further second magnetic pole having a surface in a tangential direction adjacent to the at least one further first magnetic pole on the upper side, said at least one further second magnetic pole being devoid of a permanent magnet, wherein in a tangential direction the arrangement of magnetic poles comprises at least the one further first magnetic pole and at least the one further second magnetic pole as well as the first magnetic pole and the second magnetic pole.

This advantageously enables, at low cost and with high quality, an electric machine to be provided in which the multi-pole component has a number of magnetic poles. This also advantageously enables an inventive secondary part to have a smaller number of multi-pole components. This enables the installation effort for inventive manufacturing of an inventive electric machine and/or in an inventive method for a service to be kept small.

The magnetic poles without permanent magnets can have inventive fastening facilities. Thus advantageously, at low cost and with high quality, an electric machine can be provided in which where necessary the fastening facilities are used for an advantageously even fastening between the first magnetic poles.

The multi-pole component can have a magnetic pole at its first and second tangential end in each case which does not have any permanent magnets. Thus the multi-pole component can be fastened advantageously at low cost and with high quality to the tangential ends of the multi-pole component. This advantageously enables the multi-pole components to be fastened to the secondary part with a defined contact between the tangential ends of the multi-pole component and the secondary part.

According to another advantageous feature of the present invention of a secondary part according to the invention, a first and the second multi-pole component can be disposed in a tangential direction following one another, wherein the first multi-pole component and the second multi-pole component are each an inventive multi-pole component, wherein the second multi-pole component has a further magnetic pole, which together with the second magnetic pole of the first multi-pole component, forms a magnetic pole. Thus advantageously, at low cost and with high quality, an electric machine can be made available in which the first and the second multi-pole component can be fastened to the further magnetic pole without permanent magnets on the secondary part.

Advantageous embodiments of inventive multi-pole components, inventive secondary parts, inventive electric machines and also inventive methods for manufacturing the multi-pole components or electric machines and inventive methods for servicing electric machines advantageously emerge through combination of a few or a number of different features.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
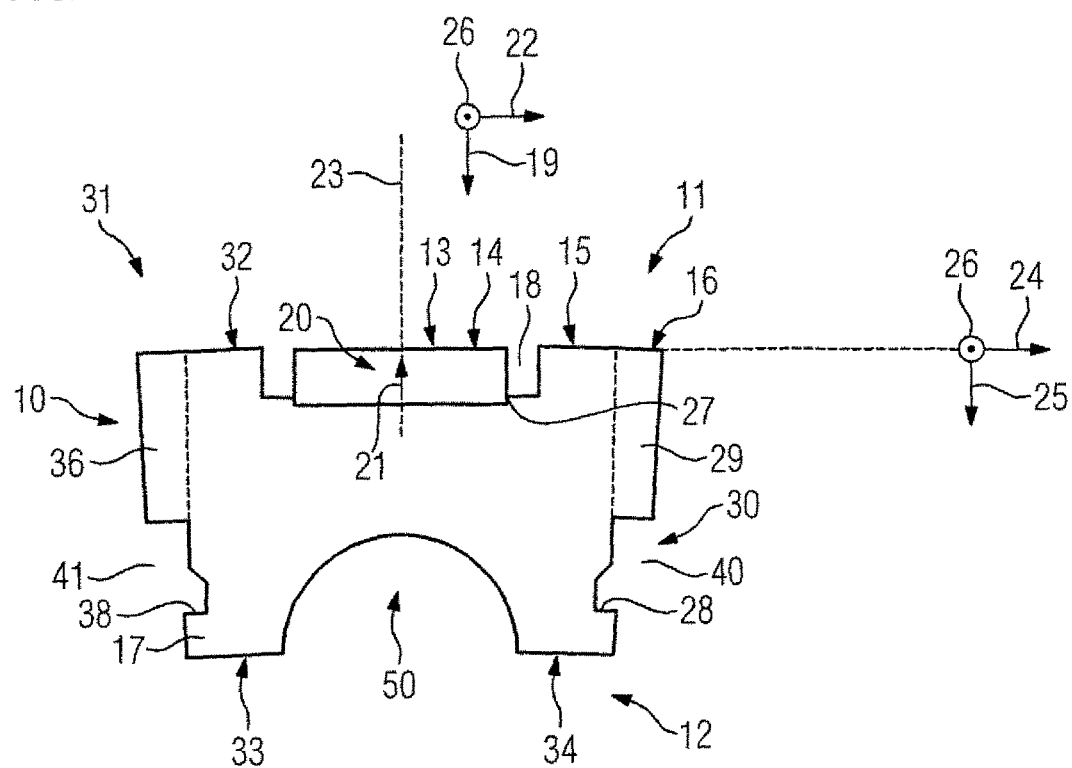
FIG. 1 shows an exemplary embodiment of a multi-pole component.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown an exemplary embodiment of a multi-pole component 10. The multi-pole component 10 for an electric machine 1 (see FIG. 4) comprises an upper side 11, a lower side 12 and a first magnetic pole 13, which possesses a surface 14 on the upper side 11. Furthermore the multi-pole component 10 comprises a second magnetic pole 15, which possesses a surface 16 in a tangential direction 22 adjacent to the first magnetic pole 13 on the upper side 11, and a soft-magnetic device 17, wherein this device 17 has a recess 18 between the first magnetic pole 13 and the second magnetic pole 15. A vertical direction 19 is aligned from the upper side 11 to the lower side 12 at right angles to a tangential direction 22. The multi-pole component 10 extends in an axial direction 26, which runs at right angles to the tangential directions 22, 24 and the vertical directions 19, 25. The tangential directions 22, 24 run in a sectional plane at right angles to the axial direction 26 and have slightly different directions in the sectional plane in the exemplary embodiment according to FIG. 1. The reason for this is that the surface 14 of the first magnetic pole 13 and the surface 16 of the second magnetic pole 15 do not run in parallel to each other in the sectional plane. A first tangential direction 22 runs in a direction of the tangent on the surface 14 of the first magnetic pole 13 in the sectional plane. A further tangential direction 24 runs in a direction of the tangent on the surface 16 of the second magnetic pole 15. Accordingly there is a vertical direction 25 aligned from the upper side 11 to the lower side 12 at right angles to the first tangential direction 22 and a vertical direction 25 from the upper side 11 to the lower side 12 at right angles to the further tangential direction 24. The first magnetic pole 13 has a permanent magnet 20 with a magnetization in a direction 21. The second magnetic pole 15 has no permanent magnets. The direction 21 of the magnetization of the permanent magnets 20 runs predominantly on a line 23 in parallel to a vertical direction 19. The permanent magnet 20 thus has a North Pole on its first axial end on the surface 14 of the first magnetic pole 13 and has a south pole on the opposite side at its second axial end. The second magnetic pole 15 projects from the upper side 11 in relation to the first magnetic pole 13. This can be seen well in FIG. 1 by a corner of the permanent magnet 20 being set back in relation to an adjacent corner of the second magnetic pole 15 in the tangential direction 22. The recess 18 runs in the direction 21 of the magnetization. In the exemplary embodiment of FIG. 1 the cutout is empty and thus has a low relative permeability number, which is less than 2. The soft-magnetic device 17 consists of metal sheets made of a ferromagnetic metal laminated in the axial direction 26 and has the second magnetic pole 15 formed from the metal sheets. The soft-magnetic device 17 forms a form-fit facility 27 with the recess 18 for securing the permanent magnet 20 against slippage. Advantageously, at low cost and with high quality, an electrical machine can be made available in this way in which, with the multi-pole component 10, the soft-magnetic device 17 with punched sheets forms the second magnetic pole 15, the form-fit facility 27 for securing a permanent magnet 20, a fastening element 28 for fastening the multi-pole component 10 and a recess 29 for actuating a fastening device 30 for the multi-pole component 10. The fastening element 28 for fastening the multi-pole component 10 is located in a vertical direction 25 below the surface 16 of the second magnetic pole 15. The surface 16 of the second magnetic pole 15 has the recess 29 for actuating the fastening facility 30 for the multi-pole component 10. The multi-pole component 10 has a further magnetic pole 31 without permanent magnets, which possesses a surface 32 on the upper side 11, wherein in tangential directions 22, 24 the first magnetic pole 13 is located between the further magnetic pole 31 and the second magnetic pole 15. The multi-pole component 10 has a further fastening element 38 for fastening it, wherein the further fastening element 38 is located in a vertical direction below the surface 32 of the further magnetic pole 31. The fastening element 28 and the further fastening element 38 are each a part of a slot 40, 41 with an undercut for engagement of a slot nut 60. Advantageously, at low cost and with high quality, for an electric machine as in the exemplary embodiment of FIG. 1, the lower side 12 of a multi-pole component 10 can have support surfaces 33, 34 which are aligned in the sectional plane like the surfaces 16, 32 of the first magnetic pole 13 or of the further magnetic pole 31. The sectional plane is spanned by the tangential directions 22, 24 and the vertical directions 19, 25. Thus the multi-pole component 10 in accordance with FIG. 1 can advantageously be secured along a circular curved surface of a secondary part. Advantageously the multi-pole component 10 has a recess 50 for this which additionally advantageously saves material, weight and consequently mass inertia.

Figure 2:
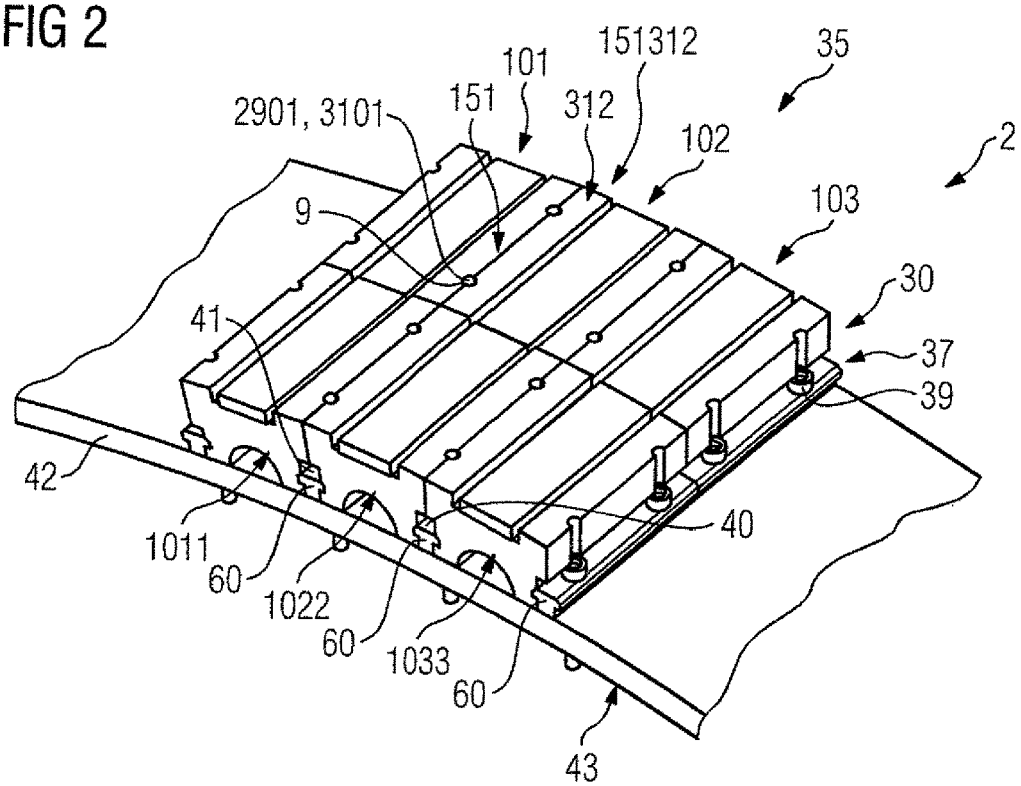
FIG. 2 shows a detail of an exemplary embodiment of a secondary part having a few multi-pole components in accordance with FIG. 1.

FIG. 2 shows a detail of an exemplary embodiment of a secondary part 2, which has a number of multi-pole components 101, 102, 103, 1011, 1022, 1033 in accordance with FIG. 1. The secondary part 2 comprises a secondary part segment 35 which features the multi-pole component 101. The multi-pole components 101, 102, 103 are multi-pole components 10 in accordance with the exemplary embodiment of FIG. 1. The secondary part 2 features the multi-pole component 10 as a first multi-pole component 101. The secondary part 2 includes a second multi-pole component 102, wherein the first multi-pole component 101 and the second multi-pole component 102 are disposed in tangential directions 22, 24 following on from one another. The second multi-pole component 102 is a multi-pole component 10 in accordance with the exemplary embodiment of FIG. 1. The second multi-pole component 102 thus has a further magnetic pole 312, which corresponds to the further magnetic pole 31 of FIG. 1. The further magnetic pole 312 of the second multi-pole component 102, together with the second magnetic pole 151 of the first multi-pole component 101, forms a magnetic pole 151312. The second magnetic pole 151 of the first multi-pole component 101 corresponds to the second magnetic pole 15 of the exemplary embodiment of FIG. 1. The first multi-pole component 101 and the second multi-pole component 102 are attached at the further magnetic pole 151312 without permanent magnets to the secondary part 12. The recess 29 on the surface 16 of the second magnetic pole 15 can have a part of an edge 9 which is able to be extended by a further multi-pole component 102 to an edge 9. The said reference characters relate to FIG. 1 or FIG. 2. This is necessary since the first multi-pole component 101 and the second multi-pole component 102 have the same design as the multi-pole component 10 in accordance with the exemplary embodiment of FIG. 1. Accordingly the recess 2901 of the first multi-pole component 101 corresponds to the recess 29, which has the surface 16 of the second magnetic pole 15 of the multi-pole component 10 in accordance with FIG. 1. In the second multi-pole component 102 a surface of a further magnetic pole 312 has a recess 3101, which corresponds to a recess 36 of the multi-pole component 10 of FIG. 1, wherein the surface 32 of the further magnetic pole 312 has the recess 36 for actuating a further fastening device for the multi-pole component 10. Thus a recess which is formed by the recess 2901 of the first multi-pole component 101 and the recess 3101 of the second multi-pole component 102, has an edge 9. The recess 29 for actuating the fastening device 30 for the multi-pole component 10 runs from the upper side 11 through the multi-pole component 10 to the lower side 12 of the multi-pole component 10. Thus the fastening device 30 can have an actuation device 37 for actuating the fastening device 30 from the upper side 11 or from the lower side 12. The actuation device 37 can have a hole with an internal thread for actuation from the upper side 11 of the lower side 12 by tightening or loosening a fastening element 39 with an outer thread. In the exemplary embodiment of the secondary part in accordance with FIG. 2 the actuation device 37 comprises the slot nut marked 60, which has a hole with an inner thread, in which fastening elements 39 with outer threads can be tightened or loosened from the upper side 11 or the lower side 12. For this purpose the fastening elements 39, which in the exemplary embodiment according to FIG. 1 are screws, can be introduced from the upper side 11 or from the lower side 12 through the recesses 29, 36. In the exemplary embodiment of FIG. 2 the fastening elements 39 have been introduced from the upper side 11 into the recesses 29, 36. The multi-pole component 10 or the first multi-pole component 101, the second multi-pole component 102 and a further multi-pole component 103 are fastened to the secondary part 2 with the fastening devices 30, wherein the secondary part 2 has a carrier 42 to which the multi-pole components are fastened. For fastening the multi-pole components the carrier 42 has holes with inner threads. The fastening device 30, in the exemplary embodiment of FIG. 2, includes the fastening element 28 on the first multi-pole component 101, the further fastening element 38 on the second multi-pole component 102, the slot nut 60, has at least one hole of the support 42 and at least one fastening element 39. If the carrier of the secondary part and the actuation devices do not have a thread, the recess 29 for actuating the fastening device 30 from the upper side 11 and the lower side 12 can advantageously be used for retaining and tightening the corresponding elements of a screw-nut connection. Thus advantageously, at low cost and with high quality, in an exemplary embodiment of a method for manufacturing an electrical machine or a method for servicing an electrical machine, despite the presence of disadvantageous carriers and actuation devices without threads, a fastening or, after making the multi-pole component accessible, a replacement of the multi-pole components can still be undertaken. The secondary part 2 in accordance with FIG. 2 also shows that advantageously, at low cost and with high quality, the secondary part 2 can be used in an inventive version advantageously in a space-saving manner for multi-pole components 101, 1011 arranged in the axial direction 26 directly next to one another. Advantageously no fastening devices at the ends of the multi-pole components 101, 102, 103, 1011, 1022, 1033 in their extension in the axial direction 26 are necessary.

Figure 3:
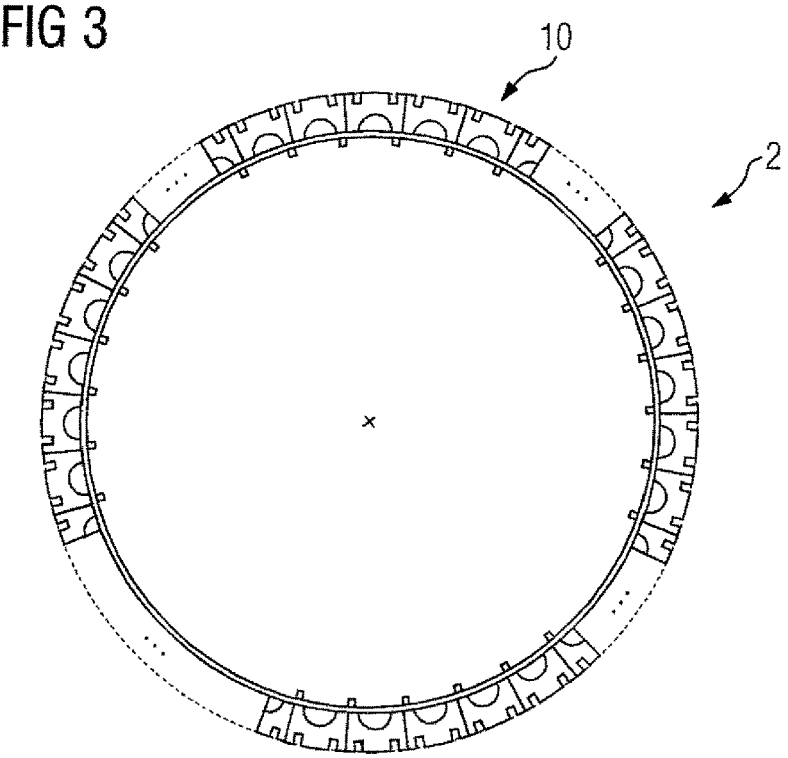
FIG. 3 shows the exemplary embodiment of the secondary part in accordance with FIG. 2 with complete equipping of a circular circumference of the secondary part.

FIG. 3 shows the exemplary embodiment of the secondary part 2 in accordance with FIG. 2 in a complete equipping of a circular circumference of the secondary part 2 with identical multi-pole components 10 according to the exemplary embodiment of FIG. 1.

Figure 4:
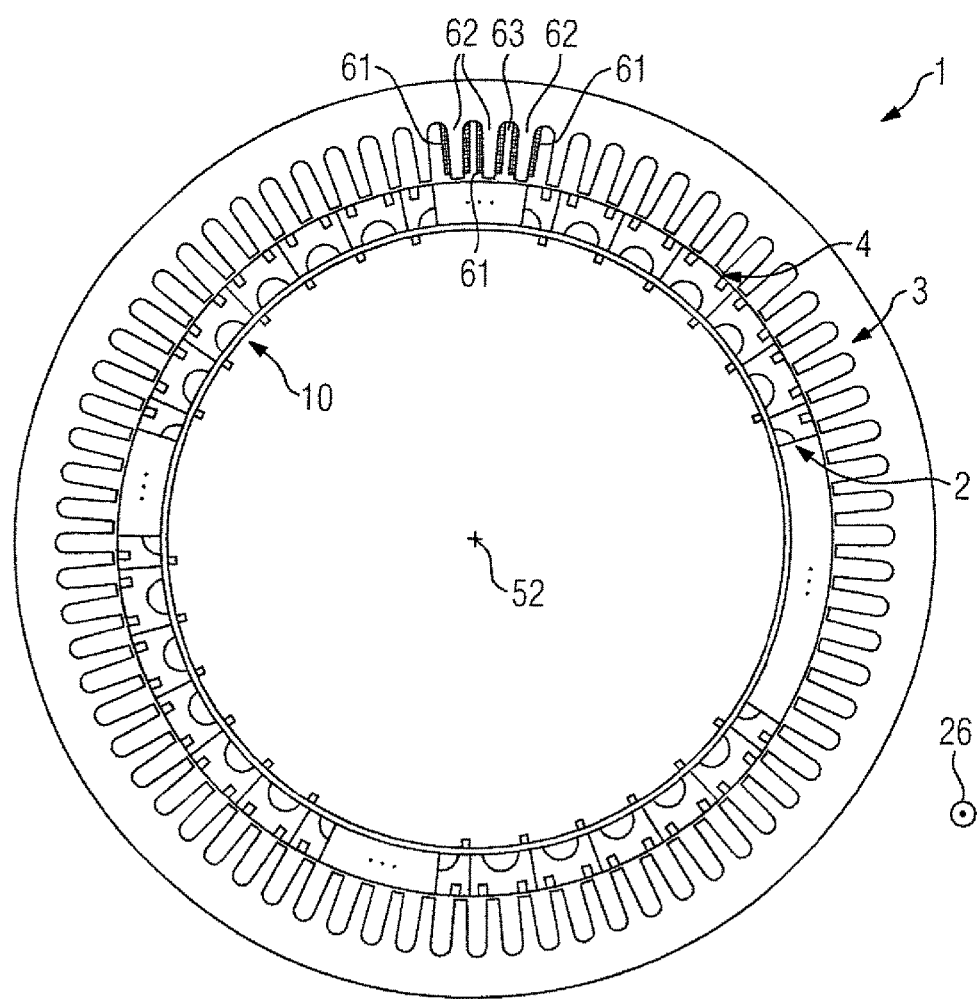
FIG. 4 shows an exemplary embodiment of an electric machine with a secondary part in accordance with FIG. 3.

FIG. 4 shows an exemplary embodiment of an electric machine 1 with a secondary part 2 according to FIG. 3. The electric machine 1 has a primary part 3 and a secondary part 2, wherein the secondary part 2 features the multi-pole component 10 for a relative rotational movement between the primary part 3 and the secondary part 2 during operation of the electric machine 1. The electric machine 1 has a winding 61 which, for operation of the electric machine 1, interacts magnetically with the multi-pole component 10 via an air gap 4 between the primary part 3 and the secondary part 2. The primary part 3, in addition to the winding 61, has further concentrated windings 61 which have the same structure as the winding 61. These concentrated winding 61 are embodied as toothed coil windings 61 and pushed onto teeth 62 of the primary part 3. In such cases two winding halves of adjacent windings 61 lie in a groove 63 of the primary part 3 between two teeth 62. During operation of the electric machine 1 the windings 61 which lie in different grooves 63 can be powered with alternating currents of different phases of a three-phase alternating current source in order to create a rotary field, which causes a rotational movement of the secondary part 2 around an axis of rotation 52. The axis of rotation 52 runs in the axial direction 26.

Figure 5:
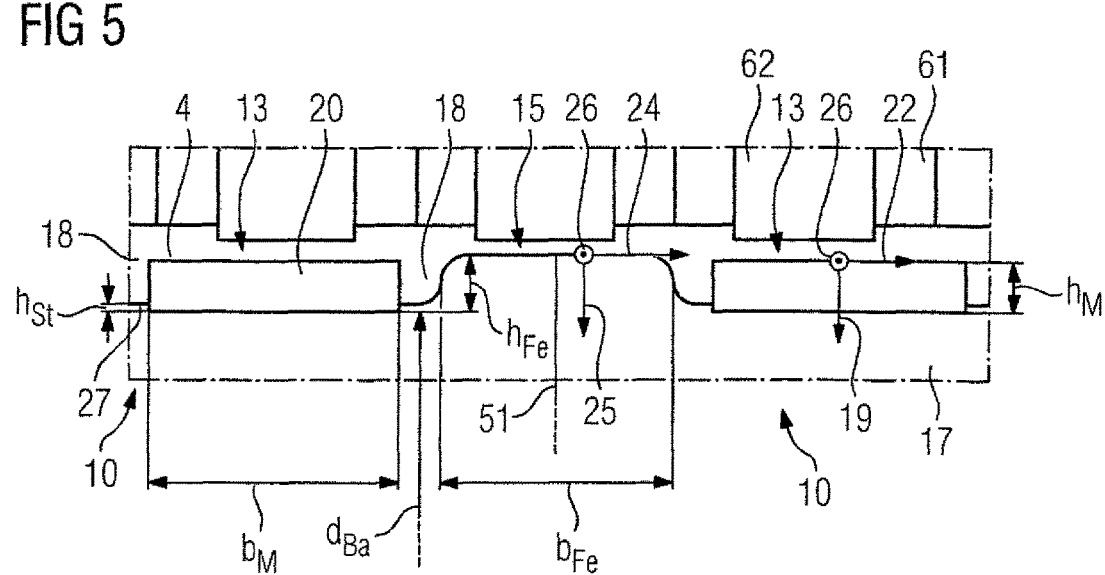
FIG. 5 shows a basic diagram of a section along an air gap of the electric machine in accordance with FIG. 4.

FIG. 5 shows a basic diagram of a section along an air gap 4 of the electric machine 1 in accordance with FIG. 4. It shows two multi-pole components 10 according to FIG. 1, which adjoin one another at an impact surface 51. For an inventive electric machine, e.g. in the exemplary embodiment of the electric machine 1 according to FIG. 4, the size of the loss of feed force F can be reduced. To this end the process can be that a width $b_{Fe}$ of the second magnetic pole 15 has 50% to 95% of a width $b_M$ and a height $h_{Fe}$ of the second magnetic poles 15 has 102% to 125% of a height $h_M$ of the first magnetic pole 13. Thus the second magnetic pole 15 projects in relation to the first magnetic pole 13 from the upper side 11 of the multi-pole component 10. Furthermore an extension of the second magnetic pole 15 in tangential directions 24, i.e. $b_{Fe}$, is less than an extension of the first magnetic pole 13 in tangential directions 22, i.e. $b_M$. The soft-magnetic material, along with the recess 18, forms a form-fit device 27 for securing the permanent magnet 20 against slippage. To this end the soft-magnetic device has a web with a web height $h_{St}$ of 5% to 40% of the height of the permanent magnet 20. The permanent magnet 20 is thus secured against slippage between two webs of the soft-magnetic device 17. The width $b_M$ of the first magnetic pole 13 is measured in tangential directions 22 and the width $b_{Fe}$ of the second magnetic pole 15 is measured in tangential directions 26. The heights $h_{Fe}$, $h_M$ and $h_{St}$ are measured relative to a common level. This common level, for the electric machine in accordance with the exemplary embodiment of FIG. 4 can be defined by a distance $d_{Ba}$ from the axis of rotation 52 of the sectional drawing according to FIG. 4. In the diagram shown in FIG. 5 the height $h_M$ of the first magnetic pole 13 is identical to the height of the permanent magnets, since an axial end of the permanent magnet coincides with the reference line to which $h_{Fe}$ and $h_M$ are related and the permanent magnet 20 forms the first magnetic pole 13.

Figure 6:
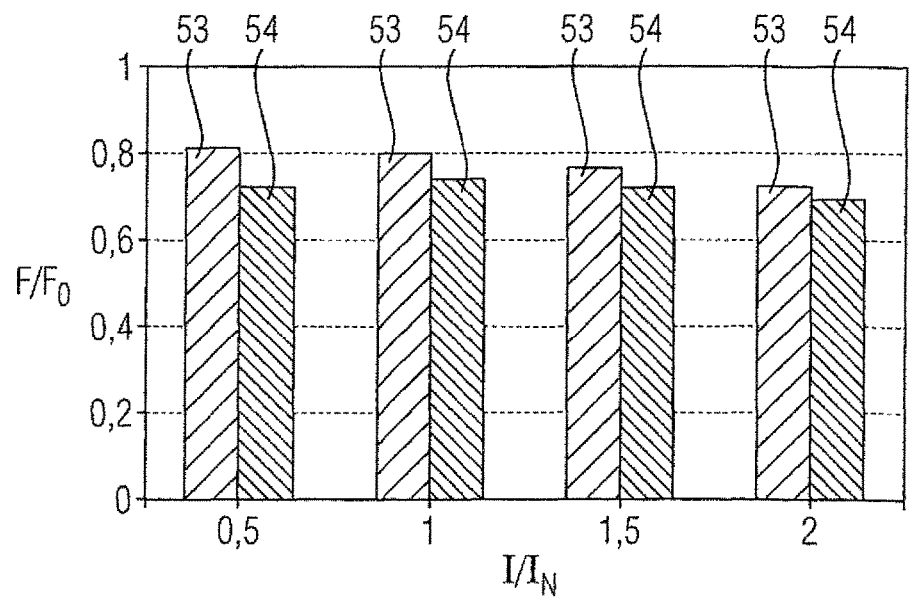
FIG. 6 shows comparative feed forces for the exemplary embodiment of the electric machine in accordance with FIG. 4.

FIG. 6 shows the comparative feed forces for the exemplary embodiment of the electric machine 1 according to FIG. 4. The secondary part 2 of the electric machine 1 according to FIG. 4 has appr. 50% less permanent magnetic material than a corresponding secondary part of an electric machine in which each magnetic pole of the secondary part has a permanent magnet. The feed force F is the force which is exerted by a magnetic interaction between the primary part 3 and the secondary part 2 via the air gap 4 on the primary part 3 or the secondary part 2. The feed force F, which was determined for the electric machine 1 in accordance with FIG. 4, is related in the diagram of FIG. 5 to a feed force $F_0$, which was determined for a corresponding electric machine, in which each magnetic pole of the secondary part has a permanent magnet. The feed forces F or $F_0$ are dependent on the current I, which flows in the windings 61 of the primary part 3. In the diagram of FIG. 6 the current I is related to a rated current $I_N$ which flows during a rated load of the electric machine in which all magnetic poles of the secondary part have permanent magnets. In the diagram of FIG. 6, for two different combinations of $b_{Fe}$ and $b_M$, as columns 53, 54 alongside one another for the current I related to the rated current $I_N$. It can be seen that with the first combination 53 the loss of feed force for a load of up to 1.5 times the rated current $I_N$ is restricted to appr. 25%. In the second combination the loss of feed force is restricted for up to twice the rated current $I_N$ to appr. 25%. In the exemplary embodiment of the electric machine 1 according to FIG. 4 the width $b_{Fe}$ has a value of appr. 95% of the value of the width $b_M$ and the height $h_{Fe}$ has a value of appr. 110% of the value of the height $h_M$.

Figure 7:
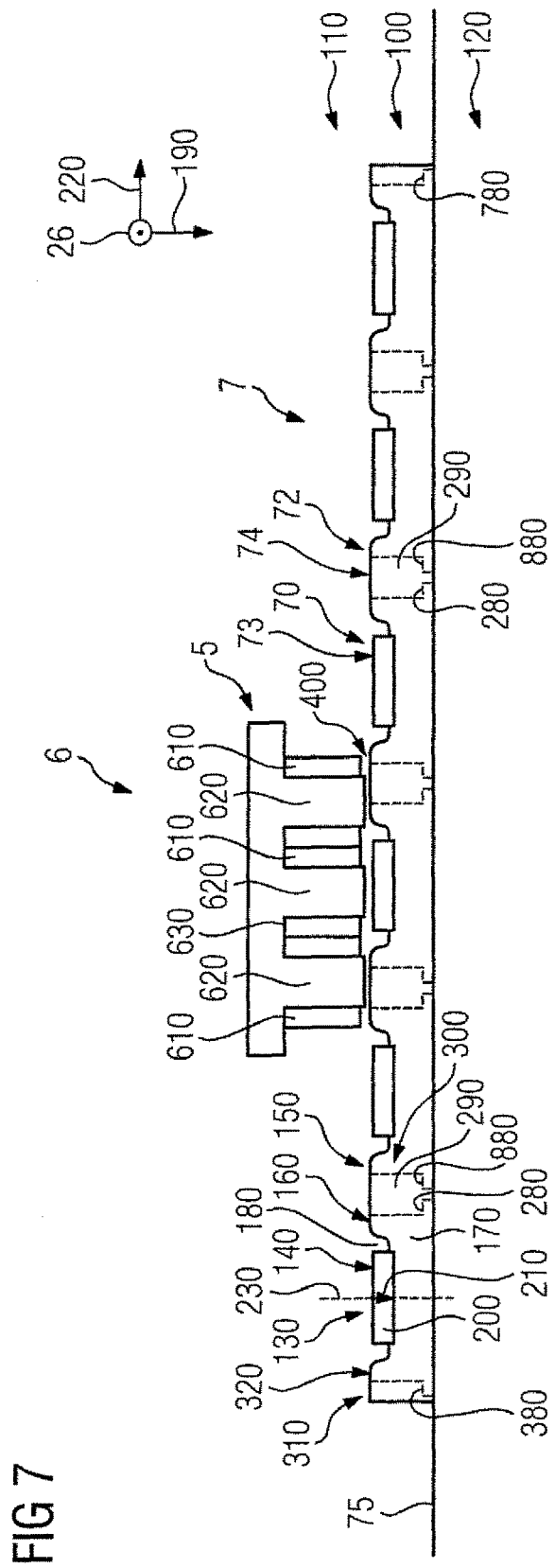
FIG. 7 shows a further exemplary embodiment of an electric machine.

FIG. 7 shows a further exemplary embodiment of an electric machine 6. The electric machine 6 includes a multi-pole component 100, wherein the electric machine 100 has a primary part 5 and a secondary part 7, wherein the secondary part 7 has the multi-pole component 100 for a relative linear movement between the primary part 5 and the secondary part 7 during operation of the electric machine 6. The electric machine has a winding 610 which, for operating the electrical machine 6, interacts magnetically with the multi-pole component 100 via an air gap 400 between primary part 5 and secondary part 7. The primary part 5, in addition to the winding 610, has further concentrated windings 610 which have the same structure as the winding 610. These concentrated windings 610 are embodied as toothed coil windings 610 and are pushed onto teeth 620 of the primary part 5. In such cases two winding paths of adjacent windings 610 lie in a groove 630 of the primary part 5 between two teeth 620. During operation of the electric machine 6 the windings 610 which lie in the different grooves 630 can be powered with alternating currents of different phases of a three-phase alternating current source, for example a converter, in order to create a magnetic Fields changing in the tangential direction along the primary part 5, which causes a relative linear movement of the primary part 5 or secondary part 7 in relation to the secondary part 7 or primary part 5 in the tangential direction 220. The multi-pole component 100 has an arrangement of magnetic poles, wherein the arrangement of magnetic poles comprises the first magnetic pole 130, the second magnetic pole 150, at least one further first magnetic pole 70 which possesses a surface 73 on the upper side 110 and at least one further second magnetic pole 72, which possesses a surface 74 in the tangential direction 220 adjacent to the at least one further first magnetic pole 70 on the upper side 110. The at least one further magnetic pole 70 has a permanent magnet 210. The at least one further second magnetic pole 72 has no permanent magnet. The arrangement of magnetic poles of the multi-pole component 100 comprises in a tangential direction 220 at least one first magnetic pole 70 and the at least one further second magnetic pole 72, as well as the first magnetic pole 130 and the second magnetic pole 150. The exemplary embodiment of the multi-pole component 100 in accordance with FIG. 7 or the exemplary embodiment of the secondary part 7 of FIG. 7 also have many features which have been described with reference to FIGS. 1 to 3 and have been provided with reference characters in FIG. 7 which are produced from the reference characters of FIGS. 1 to 3 by the addition of a "0". Thus for example the description for the fastening element 28 of FIG. 1 is to be transferred accordingly to the fastening element 280 of FIG. 7. In the exemplary embodiments in accordance with FIG. 7 all magnetic poles without permanent magnets have fastening elements 280, 380, 780, 880. Thus if necessary, advantageously at low cost and with high-quality, the multi-pole component 100 can be fastened evenly to a surface 75 with screws by the fastening elements 280, 380, 780, 880. The fastening elements 380, 780 at a first tangential end of the multi-pole component 100 and at a second tangential end of the multi-pole component 100 can advantageously be used for fastening to the surface 75 with a defined contact of the tangential ends of the multi-pole component 100.

In an exemplary embodiment of a method for manufacturing a multi-pole component 10, a permanent magnet 20 is provided for the first magnetic pole 13 and no permanent magnet 20 is provided for the second magnetic pole 15. In a further method step sheets of metal are laminated in the axial direction 26 so that the sheets of metal form the second magnetic pole 15.

In an exemplary embodiment of a method for manufacturing an electric machine 1 a multi-pole component 10, comprising the first magnetic pole 13 with permanent magnet 20 and the second magnetic pole 15 without permanent magnet, is disposed on the secondary part 2. In a further method step the multi-pole component is fastened to the secondary part 2 in a vertical direction 25 below the surface 16 of the second magnetic pole 15.

In an exemplary embodiment of a method for servicing an electric machine 1, at least one of the multi-pole components 10, comprising the first magnetic pole 13 with permanent magnet 20 and the second magnetic pole 15 without permanent magnet is replaced. In one method step the multi-pole component 10 fastened to the secondary part 2 is made accessible for this purpose.

Although the invention has been described in detail by the preferred exemplary embodiments, it is not restricted to the disclosed examples. Other variations can be derived herefrom by the person skilled in the art, without departing from the scope of protection of the invention.

Thus it would also be conceivable for example for multi-pole components for an arrangement on a circular curved surface to have more than three magnetic poles, wherein in these cases not all advantages of the invention have to be achieved.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. A multi-pole component for an electric machine, comprising:
   an upper side;
   a lower side;
   a first magnetic pole having a surface on the upper side, said first magnetic pole including a permanent magnet with a magnetization in one direction;
   a second magnetic pole having a surface in a tangential direction adjacent to the first magnetic pole on the upper side and being devoid of a permanent magnet; and
   a soft-magnetic device having a first recess between the first magnetic pole and the second magnetic pole for securing the permanent magnet, said first recess formed in the soft-magnetic device as a single step recess,
   a slot disposed proximate to the lower side underneath the second magnetic pole in a vertical direction perpendicular to the tangential direction, said slot having an undercut for engagement with a slot nut for fastening the multi-pole component on a carrier of the electric machine, said slot nut having at least one hole with an inner thread in which at least one fastening element with an outer thread is arranged in a threaded connection, and
   a second recess formed in a sidewall of the multi-pole component for introducing, tightening, and loosening the at least one fastening element in the second recess from the lower side and from the upper side.

2. The multi-pole component of claim 1, wherein the one direction of the magnetization of the permanent magnet runs predominantly on a line in parallel relation to the vertical direction.

3. The multi-pole component of claim 1, wherein the second magnetic pole protrudes in relation to the first magnetic pole from the upper side.

4. The multi-pole component of claim 1, further comprising a third recess disposed on the lower side, said recess separating support surfaces that support the multi-pole component on the carrier.

5. A secondary part for an electric machine, comprising:
   a first multi-pole component which includes an upper side, a lower side, a first magnetic pole having a surface on the upper side, said first magnetic pole including a permanent magnet with a magnetization in one direction, a second magnetic pole having a surface in a tangential direction adjacent to the first magnetic pole on the upper side and being devoid of a permanent magnet, and a soft-magnetic device having a first recess between the first magnetic pole and the second magnetic pole for securing the permanent magnet, said first recess formed in the soft-magnetic device as a single step recess, and a slot disposed proximate to the lower side underneath the second magnetic pole in a vertical direction perpendicular to the tangential direction, said slot having an undercut for engagement with a slot nut for fastening the first multi-pole component on a carrier of the electric machine, said slot nut having at least one hole with an inner thread in which at least one fastening element with an outer thread is arranged in a threaded connection, and
   a second recess formed in a sidewall of the first multi-pole component for introducing, tightening, and loosening the at least one fastening element in the second recess from the lower side and from the upper side; and
   a second multi-pole component which replicates the first multi-pole component and abuts the first multi-pole component in the tangential direction,
   wherein the second recess of the first multi-pole component and the second recess of the abutting second multi-pole component complement each other to form an opening for accessing and actuating a common slot nut for the first and second multi-pole component from the upper side.

6. The secondary part of claim 5, further comprising a third recess disposed on the lower side of at least one of the first and second multi-pole component, said recess separating support surfaces that support the at least one of the first and second multi-pole component on the carrier.

7. An electric machine, comprising:
   a primary part;
   a secondary part including a multi-pole component for a relative rotational movement and/or linear movement between the primary part and the secondary part during operation of the electric machine, wherein the
   multi-pole component includes an upper side, a lower side, a first magnetic pole having a surface on the upper side, said first magnetic pole including a permanent magnet with a magnetization in one direction, a second magnetic pole having a surface in a tangential direction adjacent to the first magnetic pole on the upper side and being devoid of a permanent magnet, and a soft-magnetic device having a first recess between the first magnetic pole and the second magnetic pole for securing the permanent magnet, said first recess formed in the soft-magnetic device as a single step recess, and a slot disposed proximate to the lower side underneath the second magnetic pole in a vertical direction perpendicular to the tangential direction, said slot having an undercut for engagement with a slot nut for fastening the first multi-pole component on the secondary part, said slot nut having at least one hole with an inner thread in which at least one fastening element with an outer thread is arranged in a threaded connection, and
   a second recess formed in a sidewall of the first multi-pole component for introducing, tightening, and loosening the at least one fastening element in the second recess from the lower side and from the upper side; and
   a winding for operating the electric machine, said winding interacting magnetically with the multi-pole component via an air gap between the primary part and the secondary part.

8. A method for manufacturing an electric machine as claimed in claim 7, comprising
   placing the multi-pole component on the secondary part;
   inserting the slot nut into the slot; and
   securing the slot nut on the secondary part with the at least one fastening element by way of the threaded connection, which is accessed through the second recess.

9. A method for servicing an electric machine as claimed in claim 7, comprising:
   replacing the multi-pole component disposed on the secondary part by disengaging through the second recess the at least one fastening element which secures the slot nut on the secondary part, removing the slot nut from the slot, withdrawing the multi-pole component, and replacing the withdrawn multi-pole component with another multi-pole component.

10. The electric machine of claim 7, further comprising a third recess disposed on the lower side of the multi-pole component, said recess separating support surfaces that support the multi-pole component on the secondary part.

11. The electric machine of claim 7, further comprising
    a further multi-pole component which replicates the multi-pole component and abuts the multi-pole component in the tangential direction,
    wherein the second recess of the multi-pole component and the second recess of the abutting further multi-pole component complement each other to form an opening for accessing and actuating a common slot nut for the first and second multi-pole component from the upper side.

12. The electric machine of claim 7, wherein the primary part and the secondary part move linearly with respect to one another.

13. The electric machine of claim 7, wherein the primary part and the secondary part move rotationally with respect to one another.

* * * * *